Patented Jan. 13, 1953

2,625,548

UNITED STATES PATENT OFFICE 2,625,548

BASICALLY SUBSTITUTED 1-(10-ACRI-DANYL)ALKANONES

John W. Cusic, Skokie, Ill., assignor to G. D. Searle & Co., Chicago, Ill., a corporation of Illinois No Drawing. Application February 1, 1951, Serial No. 208,977

12 Claims. (Cl. 260—247.2)

The present invention is concerned with a new type of heterocyclic ketones and more particularly with basically substituted 1-(10-acridanyl)-alkanones. These ketones may be represented by the following structural formula

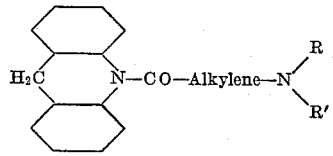

wherein NRR' is a member of the class comprising dialkylamino radicals and N-containing heterocyclic radicals attached to the alkylene radical through a nitrogen atom in the heterocycle. In the foregoing structural formula, alkylene represents such bivalent saturated aliphatic hydrocarbon radicals as ethylene, trimethylene, tetramethylene, pentamethylene, hexamethylene, propylene, butylene, amylene, and hexylene, as well as more highly branched forms isomeric thereto. R and R' may represent such lower alkyl radicals as methyl, ethyl, propyl, butyl, amyl, and hexyl, wherein the propyl, butyl, amyl, and hexyl radicals may be either of the straight chain, branched chain, or cyclic type. The radical

may also represent a nitrogen containing radical such as piperidine, lupetidine, pyrrolidine, morpholine, thiamorpholine, quinoline, isoquinoline, piperazine, N-alkyl-piperazine and the like.

The organic bases of the foregoing type form salts with a variety of inorganic and strong organic acids including sulfuric, phosphoric, hydrochloric, hydrobromic, sulfamic, citric, oxalic, ascorbic and related acids. They also form quaternary ammonium salts with a variety of organic esters of the sulfuric, hydrohalic, and aromatic sulfonic acids. Among such esters are methyl chloride and bromide, ethyl chloride, propyl chloride, butyl chloride, isobutyl chloride, benzyl chloride and bromide; phenethyl bromide, naphthylmethyl chloride, dimethyl sulfate, diethyl sulfate, methyl benzene sulfonate, ethyl toluene sulfonate, ethylene chlorohydrin, propylene chlorohydrin, allyl bromide, methallyl bromide and crotyl bromide.

The object of this invention is to provide a new type of 1-(10-acridanyl)-alkanones. Certain of these ketones are valuable intermediates in organic synthesis. They have been found to possess a number of useful pharmacodynamic properties. In particular, the acid addition salts of these compounds have a profound effect on the cardiovascular system, especially in producing vasodilation. The quaternary salts are of value in producing spasmolysis. Certain others of these esters are valuable as active ingredients in parasiticidal compositions of matter.

In one of the preferred methods for the preparation of these ketones, acridan is condensed with a halogenated alkanoyl halide of the type halogen-alkylene-CO-halogen by heating in an inert organic solvent such as an aromatic hydrocarbon or a ketone such as butanone. The resulting (10-acridancarbonyl)-alkyl halide is then reacted with the corresponding amine to replace the halogen by the desired basic group.

My invention will be described more fully in conjunction with the following examples. It should be understood, however, that these examples are given by way of illustration only and that the invention is not to be construed as limited in spirit or in scope by the details set forth. It will be apparent to those skilled in the art that many modifications in materials and methods may be made without departing from the invention. In each of these examples, temperatures are given uncorrected in degrees centigrade (°C.), quantities of material as parts by weight, and pressures during vacuum distillation in millimeters (mm.) of mercury.

EXAMPLE 1

1-(10-acridanyl)-3-chloro-1-propanone 905 parts of acridan are dissolved in 13,000 parts of anhydrous toluene by stirring and heating under reflux. A solution of 635 parts of β-chloropropionyl chloride in 1750 parts of dry toluene is added gradually with heating. The hydrogen chloride escapes in a short time and the mixture turns dark. The temperature is maintained at 80–90° C. for several hours and the mixture is then stirred with charcoal and filtered. Evaporation of the solvents leaves the 1-(10-acridanyl)-3-chloro-1-propanone. This material soon forms crystals melting at 89–90° C. It has the structural formula

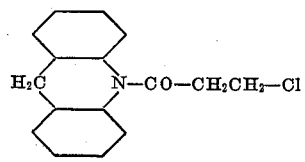

2,625,548

EXAMPLE 2

1-(10-acridanyl)-3-diethylamino-1-propanone 53 parts of 1-(10-acridanyl)-3-chloro-1-propanone are heated with 40 parts of diethylamine, one part of potassium iodide and 120 parts of butanone at 60° C. for two days in a shielded pressure reactor. The reaction product is extracted with a mixture of dilute hydrochloric acid and ether. The acid layer is separated, made alkaline by addition of sodium hydroxide and extracted with ether. The ether extract is dried over anhydrous potassium carbonate, filtered and evaporated. An etherial solution of 1-(10-acridanyl)-3-diethylamino-1-propanone is stirred and cooled while alcoholic hydrogen chloride is added thereto. The yellow precipitate of the hydrochloride melts at about 185–186° C.

EXAMPLE 3

β-(10-acridancarbonyl)ethyldiethylmethylammonium bromide 160 parts of 1-(10-acridanyl)-3-diethylamino-1-propanone are treated with 260 parts of methyl bromide in 400 parts of butanone in a shielded pressure reactor. Within five minutes an oil precipitates which solidifies on standing. Recrystallized from isopropanol with the use of charcoal as a clarifying agent, the β-(10-acridancarbonyl)-ethyldiethylmethylammonium bromide melts at about 198–199° C. It has the structural formula

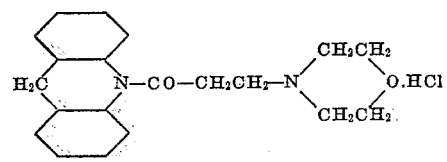

EXAMPLE 4

1-(10-acridanyl)-5-diisopropylamino-1-pentanone 181 parts of acridan are dissolved in 2500 parts of toluene and to the boiling solution, a solution of 311 parts of δ-iodopentanoyl chloride in 400 parts of toluene is added. The mixture is maintained at 90° C. for ten hours and then filtered with the use of charcoal as a clarifying agent. Upon filtration, the 1-(10-acridanyl)-5-iodo-1-pentanone is obtained. 395 parts of this ketone are reacted with 250 parts of diisopropylamine in 2000 parts of toluene in the presence of 10 parts of potassium iodide in a shielded pressure vessel for three hours. The mixture is extracted with dilute hydrochloric acid and ether. The acid layer is made alkaline by addition of dilute potassium hydroxide and extracted with ether. The ether extract is dried over anhydrous potassium carbonate, stirred with charcoal, filtered and evaporated. A yellowish oil is thus obtained which has the structural formula

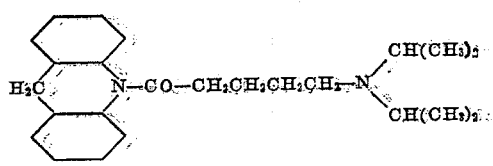

EXAMPLE 5

1-(10-acridanyl)-3-(N-morpholino)-1-propanone 271 parts of 1-(10-acridanyl)-3-chloro-1-propanone are reacted with 250 parts of morpholine in 1700 parts of toluene at refluxing temperature for three hours. The resulting mixture is extracted with dilute hydrochloric acid. The acid layer is made alkaline and extracted with ether. The ether extract is dried over anhydrous potassium carbonate, filtered and evaporated. The resulting yellow oil boils at about 234–236° C. at 2 mm. pressure. A solution of this oily base in a mixture of ether and benzene is treated with alcoholic hydrogen chloride. The yellow crystals are purified by repeated crystallization from dilute isopropanol using charcoal as a clarifying agent. The hydrochloride of 1-(10-acridanyl)-3-(N-morpholino)-1-propanone melts at about 195°–196° C. It has the formula

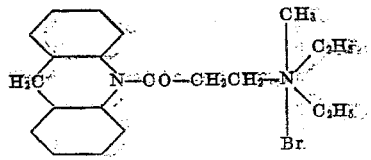

I claim:

1. The new group of organic compounds consisting of 1-(10-acridanyl)alkanone derivatives of the structural formula

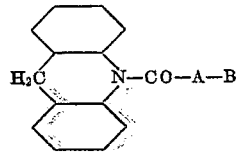

wherein A is a lower alkylene radical, B is a member of the class consisting of lower dialkylamino radicals, morpholino radicals and saturated monocyclic radicals in which a nitrogen is attached to the radical A as well as to two carbon atoms of a lower alkylene chain to form a five to six membered ring, and addition salts of the amino radical B.

2. The lower dialkylamino derivatives of 1-(10-acridanyl)alkanones of the structural formula

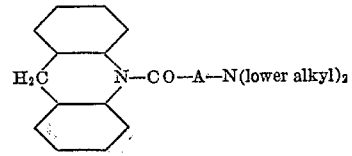

wherein A is a lower alkylene radical.

3. The lower dialkylaminoethyl derivatives of 1-(10-acridanyl)alkanones of the structural formula

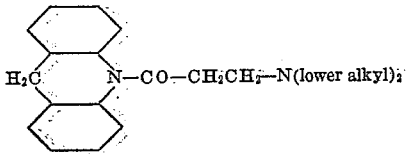

4. 1-(10-acridanyl)-3-diethylamino-1-propanone of the structural formula

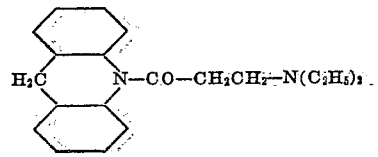

5. The (10-acridancarbonyl)alkyltrialkylammonium salts of the structural formula

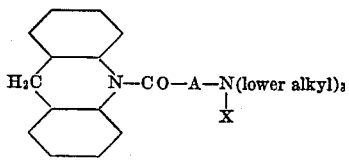

wherein A is a lower alkylene radical and X is one equivalent of an anion.

6. The β-(10-acridancarbonyl)ethyltri-(lower alkyl)ammonium salts.

7. The β-(10-acridancarbonyl)ethyldiethylmethylammonium halides.

8. The heterocyclyl derivatives of 1-(10-acridanyl)alkanones of the structural formula

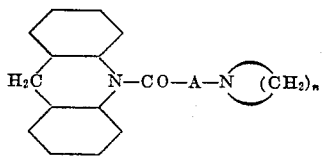

wherein A is a lower alkylene radical, and $n$ is an integer from 4 to 5, inclusive.

9. The piperidino derivative of 1-(10-acridanyl)alkanones of the structural formula

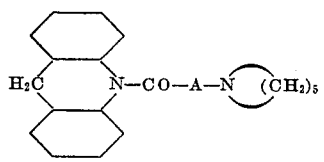

wherein A is a lower alkylene radical.

10. The morpholino derivatives of 1-(10-acridanyl)alkanones of the structural formula

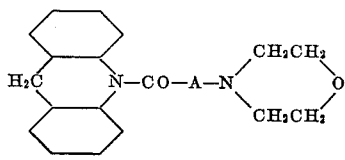

wherein A is a lower alkylene radical.

11. The method of preparing 1-(10-acridanyl)-alkanone derivatives of the structural formula

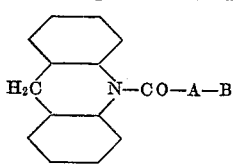

wherein A is a lower alkylene radical and B is a member of the class consisting of lower dialkylamino radicals, morpholino radicals and saturated monocyclic radicals in which a nitrogen is attached to radical A as well as to two carbon atoms of a lower alkylene chain to form a five to six membered ring, which comprises the condensation of acridan with a halogenated lower alkanoyl halide of the type halogen—A—CO—halogen to form the (10-acridancarbonyl)alkyl halide which is then reacted with an amine of the formula BH, A and B being defined as hereinabove.

12. The method of preparing 1-(10-acridanyl)-alkanone derivatives of the structural formula

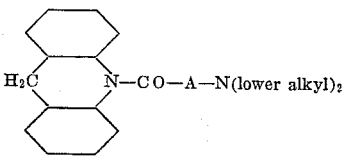

wherein A is a lower alkylene radical, which comprises the condensation of acridan with a chlorinated lower alkanoyl chloride of the type Cl—A—CO—Cl in an inert organic solvent in which both reactants are soluble to form the (10-acridancarbonyl)alkyl chloride which is then reacted with a di-lower-alkylamine.

JOHN W. CUSIC.

No references cited.